Feb. 10, 1925.                                                  1,526,134
E. L. GILMORE
REEL ATTACHMENT
Filed March 6, 1924
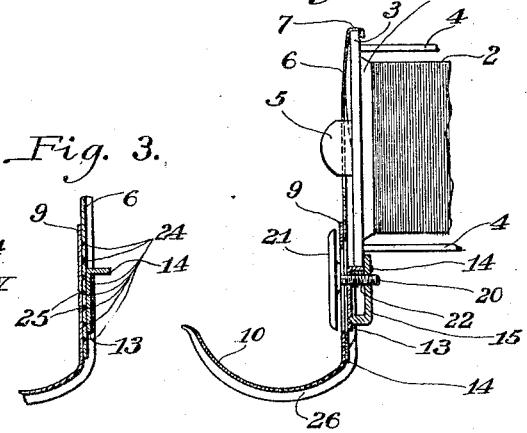
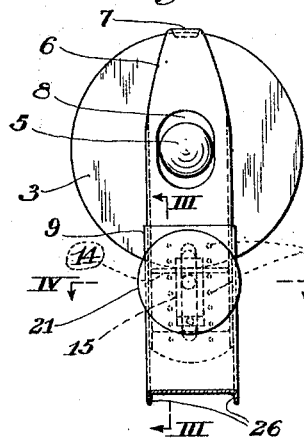
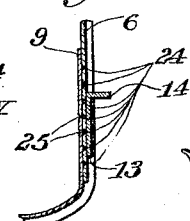
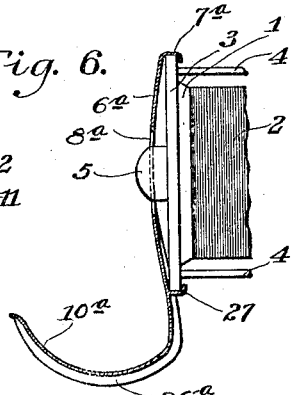
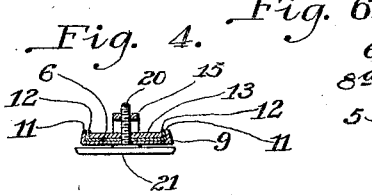
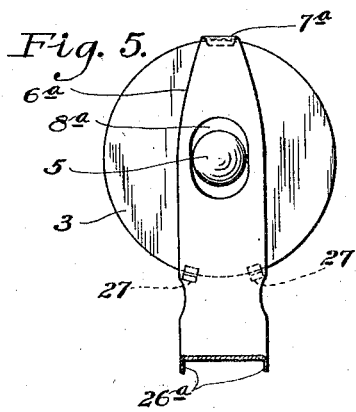
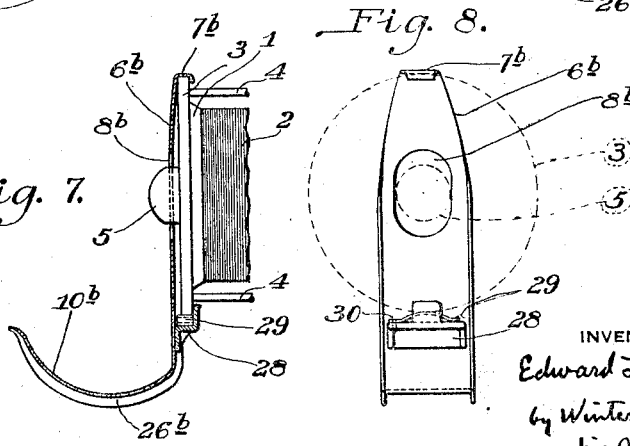
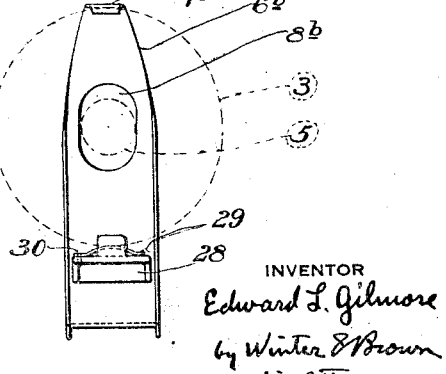
WITNESSES
INVENTOR
Edward L. Gilmore
by Winter & Brown
his Attorneys Patented Feb. 10, 1925.

1,526,134

UNITED STATES PATENT OFFICE.

EDWARD L. GILMORE, OF YOUNGSTOWN, OHIO.

REEL ATTACHMENT.

Application filed March 6, 1924. Serial No. 697,231.

*To all whom it may concern:*

Be it known that I, EDWARD L. GILMORE, a citizen of the United States, and a resident of Youngstown, in the county of Mahoning and State of Ohio, have invented a new and useful Improvement in Reel Attachments, of which the following is a specification.

This invention relates to detachable grips for use with fishing reels.

One object of the invention is to provide a hand-hold or grip for standard forms of fishing reels that may be readily attached to or detached from the reels without tools or screws, simple and cheap in construction, of few parts, and of light weight. Another object is to make a grip that is readily adjustable for hands and reels of different sizes.

Referring to the drawings Fig. 1 is a partial side elevation of an ordinary fishing reel, showing in section one form of my grip attached thereto; Fig. 2 is an end view of the reel with the grip as shown in Fig. 1 thereon; Fig. 3 is a partial section on the line III—III of Fig. 2; Fig. 4 is a partial section on the line IV—IV of Fig. 2; Fig. 5 is an end view of the reel with a modified and simplified form of grip applied thereto; Fig. 6 is a side view of the reel showing the grip of Fig. 5 in longitudinal section thereon; Fig. 7 illustrates still another modification, the grip being in section, and the reel shown in side elevation; and Fig. 8 is an underside view of the grip of Fig. 7, with the end plate of the reel indicated in dotted line.

Fishing reels are ordinarily used for carrying a line, one end of which is fastened to the spindle of the reel, and the other end of which carries the hook and bait, the line being wound upon the reel spindle, and passing out through guides on the fishing rod beyond the reel. For more securely holding the reel and rod while the line is being wound in, or while playing a fish, and at other times, it is desirable to have a grip or hand-hold for engaging the hand of the fisherman. Such grips have heretofore been applied to the rod near the reel, and also to the reel itself.

The grips herein described differ from those in the prior art in that they are entirely independent of the rod and are attachable to and readily detachable from the reel itself, without screws or supplementary parts of any kind. Furthermore, in the preferred form, the present mechanism is adjustable to fit hands of different sizes, and to fit upon reels of different sizes.

Referring to the drawings Figs. 1 to 4 show a preferred embodiment of my invention applied to an ordinary fishing reel, comprising a spindle 1, having a line 2 wound thereon, and an end plate 3. It will be understood that there is another end plate at the other side of the reel connected by cross braces 4, in the usual manner. The mechanism for driving the spindle, etc., is housed on the outside of the other end plate of the reel, and not having anything to do with this invention is not here illustrated. Fishing reels are of well known construction. Practically all of them comprise an end plate corresponding to that here illustrated and designated by the numeral 3, and in the central outer portion of these end plates there is a projecting lug or housing 5, which is bored to form an oil-retaining bearing for the shaft of the spindle 1.

The particular form of grip illustrated in Figs. 1, 2, 3 and 4, comprises a main body member 6 having a terminal hook 7 adapted to engage the edge of the end plate 3 of the reel. In its middle portion the member 6 has an elongated opening 8 permitting the body member 6 to be seated on the end plate around the lug 5 free to move longitudinally but not laterally, as clearly illustrated in Fig. 2. A second member 9, having a terminal hook 10, forming the actual handhold or grip, is slidably mounted on the body member 6, having its lateral edges turned over to form flanges 11, engaging similarly inturned flanges 12, on the body member 6, as shown in Fig. 4. Slidingly held in position by the inturned flanges 12 of the body member 6 is a third plate member 13, having a turned down end portion 14, the edges of which are slotted to receive the end of a hook or dog member 15, the other end of which passes freely through a hole in the plate 13, as illustrated in Fig. 1. A screw 20 passes through slots in the members 6 and 9, through a close-fitting hole in the plate 13, and makes threaded engagement with the hook member 15. This screw has an outer knurled head 21. Between the plate 13 and the hook member 15 the screw 20 is surrounded by a small coil spring 22. On each side of the slot in the member 6 there is a series of evenly-spaced aligned indentations 24, and on the underside of the member 9, on each side of the slot therein, in parallel registering alignment with the indentations 24, are two or more projections 25 adapted to engage the indentations 24. These are for the purpose of holding the members 6 and 9 in relative position after adjustment, as will be obvious. The spring 22 tends to press the two together and the projections and depressions in registry oppose relative sliding movement of the two parts.

When it is desired to apply this form of grip to a reel, the screw 20 is loosened, thus permitting relative movement between the parts 6, 9 and 13, and the latter is withdrawn as far as permitted by the slot above described. Then the terminal hook 7 is put over the edge of the reel plate 3 and opening 8 in the member 6 passed over the lug 5. Then the plate 13 is moved up by thumb-pressure on the screw head 21 until the free end of hook member 15 engages the underside of the reel plate 3, as illustrated in Fig. 1. The grip member 9 may be moved forward or back to the position most comfortable for the hand of the particular fisherman. Then the screw head 21 is turned to the right until the three members 6, 9 and 13 are clamped tightly together. It will thus be seen that the hooks 7 and 15 engage the end plate of the reel at diametrically opposite points, and the attachment is prevented from slipping off sidewise by engagement of the opening 8 with the central lug 5. The device as a whole may be turned upon the lug 5 as a center, and thus automatically adjust itself to the most comfortable position for the hand of the fisherman, but it can not be disengaged without loosening the screw 21. This form of attachment permits this grip to be applied to reels of different sizes, and the grip portion 10 to be adjusted as to distance from the reel so as to suit hands of materially different sizes.

In Figs. 5 and 6 there is illustrated a simplified form of attachment wherein the grip consists of a single body plate of resilient metal 6ª, having a terminal hook 7ª at one end, a hand-hold hook 10ª at the other, and an intermediate opening 8ª adapted to pass over the central lug 5 of the reel plate 3. At an intermediate point on the underside of the plate one or more hooks 27, adapted to engage the opposite edge of the end plate 3, are provided. The portion of the attachment between the hooks 27 and the terminal hook 7ª is arched as illustrated in Fig. 6. The hooks 27 may be either struck up from the body of the plate, or may be soldered or otherwise attached. This form of grip is applied to the reel by engaging the hook 7ª over one edge of the end plate of the reel, positioning the intermediate opening 8ª around the central lug 5, and pressing down the metal around the lug 5 to flatten the arch. As this is done the distance between the hook 7ª and hooks 27 is increased until the hooks 27 slip over and engage the edge of the reel plate at a point diametrically opposite the hook 7ª. Obviously hooks 27 may be first engaged and the hook 7ª caused to pass over the edge of the reel end by flattening the spring arch. Release of pressure on the middle portion of the plate in either case permits it to return to its normal arched form, thus drawing the hooks into engagement with edges of the reel end.

This is an exceedingly simple form of grip that may be readily applied to and disconnected from reels but it has the disadvantage of not being adjustable to suit different sizes of hands, and it can only be applied to reels of the size for which it is designed.

Figs. 7 and 8 illustrate still another modification in that the grip is formed of a metal plate 6ᵇ, having a terminal engaging hook 7ᵇ, with an intermediate opening 8ᵇ adapted to pass over the central lug 5 of the reel plate 3. On the underside of the plate there is fastened by any suitable means a hook member 28, one form of which is illustrated in Figs. 7 and 8. On the inner face of this hook member there is carried a small arched spring 29, rigidly attached at one end as by a screw 30, and free at its other. This spring is positioned so that when the tip of the hook 28 is positioned underneath the edge of the reel plate 3, as illustrated in Fig. 7, and pressed upward, the spring 29 is flattened out, thus permitting the terminal hook 7ᵇ to be moved into position to pass over the other edge of the reel plate. When this is done, the pressure is released, and the spring 29 withdraws the device securing engagement of the hook 7ᵇ as illustrated in Fig. 7. It is then retained in the position illustrated by force of the spring and pressure of the fisherman's hand. The attachment is readily removed by pressing upward to again flatten the spring 29 which frees the hook 7ᵇ, in obvious manner.

This device in all of the forms illustrated is made principally from sheet metal stamping, of very light weight, and all parts are simple in construction. It can be manufactured and assembled without excessive cost. It may be readily applied to or taken from any standard form of reel, without the necessity of screws or tools of any kind, and without requiring any change whatever in the reel structure. It is entirely independent of the rod itself, and since the end plates of reels are standardized, the attachment has universal application.

I claim:

1. A grip device for fishing reels comprising a curved hand-hold at one end adapted to engage the underside of the hand of a fisherman, a hook on the other side of the device at the same end as the hand-hold, said hook being adapted to engage the peripheral edge of an end plate of a reel, a central opening in the body of the device adapted to permit the device to be freely seated around a central external lug in the reel end, and a terminal hook on the end opposite that carrying the hand-hold, said hook being adapted to engage the peripheral edge of the reel.

2. A grip for attachment to a fishing reel having an end plate with a central external lug thereon, the device comprising a body member having a central opening adapted to pass freely over the said lug and hooks adapted to engage the said end plate at diametrically opposite points, and releasable means independent of the reel to hold the hooks in engagement with the end plate.

3. A reel grip device adapted to engage the end plate of a reel, having an opening in the middle portion of the body of the device adapted to pass freely over a central external lug in the reel end, and having hooks adapted to engage the peripheral edge of the reel plate at diametrically opposite points.

4. A reel grip device adapted to engage the end plate of a reel having a central projecting lug thereon, the device having a central opening adapted to fit over the lug in the reel end without fixed attachment thereto, hooks adapted to engage the periphery of the reel end at diametrically opposite points, and releasable means on the device for holding the hooks in engaged position.

5. A reel grip device adapted to engage the end plate of a reel having a central projecting lug thereon, the device having a central opening adapted to pass freely over the lug in the reel end, and having hooks adapted to engage the periphery of the reel end at diametrically opposite points, the body of the device consisting of a resilient arched spring member adapted to retain the hooks in engaged position on the reel plate by resiliency of the body member itself.

6. A device for attachment to a fishing reel having an end plate with a central external lug thereon, the device comprising a plate member having an elongated opening adapted to fit over the central lug in the reel end, and a terminal hook adapted to engage the peripheral edge of the reel plate, a second hook on the underside of the device at an intermediate point and adapted to engage the end plate at a point diametrically opposite the first mentioned hook, and a terminal hand-hold carried by the device at the end opposite said terminal hook.

7. A reel grip carrying a hand-hold at one end, having a hook at the other end adapted to engage one edge of a reel plate, a second hook carried at an intermediate point of the clamp and adapted to engage the reel plate at a point diametrically opposite the place of engagement of the first mentioned hook, and a resilient member normally retaining the hooks in engagement with the reel plate.

8. A reel grip device having a terminal hand-hold, the device comprising a terminal reel-engaging hook at one end, a second reel-engaging hook intermediate the hand-hold and first mentioned hook, and a spring normally urging the hooks toward each other, the two hooks being positioned and adapted to engage the edges of an end plate of a reel and to be held in engagement therewith by resiliency of the said spring.

9. A reel grip device carrying a hand-hold, a terminal hook adapted to engage the edge of a reel plate at a point diametrically opposite a hand-hold, a second hook on the underside of the clamp adapted to engage the reel plate diametrically opposite the first mentioned hook, and a yieldable resilient member between the hooks normally holding them a distance apart less than the diameter of the reel plate, the resilient member having an opening adapted to permit seating of the member around a central lug in the reel plate.

10. A reel grip device comprising a single piece of metal having a reel-engaging hook at one end, a hand-hold at the other, and an intermediate underside reel-engaging hook, the portion of the device between said hooks being perforated to engage a central external lug of a reel plate and normally arched from the plane of the reel plate, whereby when the clamp is flattened against the reel plate the hooks are extended over the edges thereof at diametrically opposite points and positively engage the edges as the clamp resumes its normal arched shape.

11. A reel clamp adapted to engage an end plate of a reel having a central projecting lug thereon, comprising a body member having a terminal hook adapted to engage an edge of the reel plate and an opening adapted to receive the central lug of the reel plate, a hand-hold member slidably connected to the body member, a third member slidably connected to the body member and carrying a dog adapted to engage the edge of the reel plate, and a set screw passing through slots in the body and hand-hold members and threaded through the said dog, whereby to clamp the slidable members together in adjusted position.

12. A grip device for attachment to fishing reels, comprising a body member having a terminal hook adapted to engage the edge of a reel plate and an elongated opening therethrough adapted to engage the central lug of the reel plate, a second member forming a terminal hand-hold and slidably connected to the first mentioned member; a slidable hook member mounted on the underside of the body member in position to engage the edge of the reel plate at a point diametrically opposite the first mentioned hook, and a screw extending through slots in the body member and second member into the hook member whereby to clamp the body and hand-hold members in adjusted position and the hook member in engaged position.

In testimony whereof, I sign my name.

EDWARD L. GILMORE.